United States Patent
Murthy et al.

(10) Patent No.: US 10,771,156 B2
(45) Date of Patent: Sep. 8, 2020

(54) SYSTEMS AND METHODS FOR IMPROVED OPTICAL WIRELESS COMMUNICATIONS BASED ON MOBILITY PATTERNS

(71) Applicant: SIGNIFY HOLDING B.V., Eindhoven (NL)

(72) Inventors: Abhishek Murthy, Eindhoven (NL); Sirisha Rangavajhala, Eindhoven (NL); Olaitan Philip Olaleye, Eindhoven (NL); Talmai Brandão De Oliveira, Eindhoven (NL); Rohit Kumar, Eindhoven (NL); Jasleen Kaur, Eindhoven (NL); Alexandru Darie, Eindhoven (NL); Hassan Mohanna, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/347,843

(22) PCT Filed: Nov. 2, 2017

(86) PCT No.: PCT/EP2017/078072
§ 371 (c)(1),
(2) Date: May 7, 2019

(87) PCT Pub. No.: WO2018/086982
PCT Pub. Date: May 17, 2018

(65) Prior Publication Data
US 2019/0319704 A1    Oct. 17, 2019

Related U.S. Application Data

(60) Provisional application No. 62/420,086, filed on Nov. 10, 2016.

(30) Foreign Application Priority Data

Dec. 15, 2016    (EP) .................................... 16204253

(51) Int. Cl.
*H04B 10/00*    (2013.01)
*H04B 10/116*   (2013.01)
(Continued)

(52) U.S. Cl.
CPC ....... *H04B 10/116* (2013.01); *H04B 10/1129* (2013.01); *H04B 10/1149* (2013.01); *H04W 72/0453* (2013.01); *H04W 72/087* (2013.01)

(58) Field of Classification Search
CPC . H04B 10/116; H04B 10/112; H04B 10/1129; H04B 10/114; H04B 10/1143;
(Continued)

(56) References Cited

U.S. PATENT DOCUMENTS

| 2013/0013091 A1 | 1/2013 | Cavalcanti et al. |
| 2015/0012600 A1 | 1/2015 | Chakra et al. |

(Continued)

FOREIGN PATENT DOCUMENTS

| EP | 2398301 A1 | 12/2011 |
| WO | 2015001435 A2 | 1/2015 |
| WO | 2016038353 A1 | 3/2016 |

*Primary Examiner* — Hanh Phan
(74) *Attorney, Agent, or Firm* — Daniel J. Piotrowski

(57) ABSTRACT

Techniques are described herein for to improving optical wireless communications based on mobility patterns. In various embodiments, one or more mobility patterns observed in an area over time may be determined (302). The area may be illuminated by one or more lighting units (102) configured to transmit information using optical wireless communications ("OWC"). An applicable mobility pattern may be selected (308) from the one or more mobility patterns. Based on the selected mobility pattern, usage in the area of a plurality of OWC-based mobile apps (230) may be (Continued)

predicted (310). One or more OWC resources of at least one of the one or more lighting units may be allocated (312) for transmission of data to one or more of the plurality of OWC-based mobile apps operating on one or more mobile devices operated within the area. In various embodiments, the allocating may be based at least in part on the predicted usage.

15 Claims, 3 Drawing Sheets

(51) Int. Cl.
| | | |
|---|---|---|
| *H04B 10/112* | (2013.01) | |
| *H04B 10/114* | (2013.01) | |
| *H04W 72/04* | (2009.01) | |
| *H04W 72/08* | (2009.01) | |

(58) Field of Classification Search
CPC ............ H04B 10/1149; H04B 10/1123; H04B 10/1141; H05B 37/0227; H05B 33/0845; H05B 33/0872; H04W 72/087; H04W 72/0453
USPC ....... 398/172, 118, 119, 128, 130, 127, 129, 398/131, 115, 135, 136, 33, 67, 69, 72; 315/312, 292, 294, 316, 307
See application file for complete search history.

(56) References Cited

U.S. PATENT DOCUMENTS

2015/0372753 A1* 12/2015 Jovicic ................ H04B 10/116
                                                            398/172
2016/0149640 A1*  5/2016 Jovicic ................ H04B 10/116
                                                            398/127

\* cited by examiner

SYSTEMS AND METHODS FOR IMPROVED OPTICAL WIRELESS COMMUNICATIONS BASED ON MOBILITY PATTERNS

CROSS-REFERENCE TO PRIOR APPLICATIONS

This application is the U.S. National Phase application under 35 U.S.C. § 371 of International Application No. PCT/EP2017/078072, filed on Nov. 2, 2017, which claims the benefits of European Patent Application No. 16204253.5, filed on Dec. 15, 2016 and U.S. patent application Ser. No. 62/420086, filed on Nov. 10, 2016. These applications are hereby incorporated by reference herein.

TECHNICAL FIELD

The present invention is directed generally to optical wireless communications. More particularly, various inventive methods and apparatus disclosed herein relate to improving optical wireless communications based on mobility patterns.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Optical wireless communication ("OWC") facilitates wireless transmission of information using visible and invisible light. One type of OWC is Visible Light Communication ("VLC"), in which the visible spectrum of light emitted by lighting units is modulated to carry information. Other types of OWC may employ other forms of light, including but not limited to infrared and/or ultraviolet. Equipping lighting units for OWC may enable the lighting units to support networking-based applications, such as online retail, coupon distribution, airline/hotel/train check-ins, online review services, and so forth. As OWC-based applications gain popularity in indoor and outdoor environments, the Quality of Service ("QoS") provided by the employed OWC technology to the various applications takes on increasing importance. QoS may be primarily defined by packet drop rates, jitter, and/or channel utilization, and may be impacted by varying demand generated by end users that carry or otherwise operate various mobile devices (e.g., smart phones, tablets, smart watches, other wearable devices, vehicle computing systems, etc.). For example, in outdoor environments, mobility patterns of individuals may cause significant variability in traffic patterns. Accordingly, there is a need in the art for awareness about mobility patterns and/or demographics of end users for delivering optimal QoS and differentiated services to OWC-based applications.

SUMMARY

The present disclosure is directed to inventive methods and apparatus for improving optical wireless communications ("OWC") based on mobility patterns. For example, in various embodiments, mobility patterns within a particular area may be determined, e.g., based on wireless communication activity associated with mobile devices in the area. For example, call data records ("CDRs," also referred to as "call detail records")—which document details of telecommunication transactions, such as cellular telephone calls, text messages, etc.—generated by mobile devices within the area may be accumulated and analyzed to derive mobility patterns of individuals that operated their mobile devices within the area. The mobility patterns may be used to predict when, where, and/or how individuals are likely to travel through, occupy, and/or otherwise utilize the area at any given time. Additionally, the mobility patterns may be used in some embodiments, alone or in combination with other information such as demographic data (observed or estimated), to predict usage in the area of a plurality of mobile device software applications (referred to herein as "mobile apps" and/or "OWC-based mobile apps"). Once the mobile app usage is predicted, one or more OWC resources of one or more lighting units in the area, such as physical layer resources including one or more sub-bands of light available to LEDs of each lighting unit, may be selectively allocated based on the predicted mobile app usage. This selective allocation (which may be enforced as a network protocol in some implementations) may provide improved QoS to one or more mobile apps deemed likely to be executing on a mobile device within the area.

Generally, in one aspect, a computer-implemented method may include the following operations: determining one or more mobility patterns observed in an area over time, wherein the area is illuminated by one or more lighting units, and the one or more lighting units are configured to transmit information using optical wireless communications ("OWC"); selecting an applicable mobility pattern from the one or more mobility patterns; predicting, based on the selected mobility pattern, usage in the area of a plurality of OWC-based mobile apps; and allocating one or more OWC resources of at least one of the one or more lighting units for transmission of data to one or more of the plurality of OWC-based mobile apps operating on one or more mobile devices operated within the area, wherein the allocating is based at least in part on the predicted usage.

In various embodiments, the method may further include estimating demographic data about a plurality of individuals in the area based on census data associated with the area. In various embodiments, the predicted usage in the area of the plurality of OWC-based mobile apps may be further predicted based on the demographic data. In various embodiments, the method may further include predicting resource allocation needs of the plurality of OWC-based mobile apps based at least in part on the predicted usage.

In various embodiments, the allocating may include enforcing a network protocol that allocates OWC physical layer resources based at least in part on the predicted usage. In various embodiments, the one or more OWC resources may include a plurality of light bands. In various embodiments, the allocating may further include allocating a first subset of the plurality of light bands for transmission of data to a first of the plurality of OWC-based mobile apps, and allocating a second subset of the plurality of light bands for transmission of data to a second of the plurality of OWC-based mobile apps. In various embodiments, the first and second subsets may be disjoint.

In various embodiments, the one or more OWC resources may include one or more visible light communications ("VLC") resources. In various embodiments, the allocating may be based on a quality of service ("QoS") requirement associated with at least one of the plurality of OWC-based mobile apps. In various embodiments, the mobility patterns may be determined based on accumulated call data records ("CDRs") generated by mobile devices operated within the area. In various embodiments, the mobility patterns may be determined based on position coordinate data generated by mobile devices operated within the area.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "mobility pattern" as used herein refers to a pattern of movement and/or occupancy by a plurality of individuals in a given area. A mobility pattern for a given area at a given time may be determined based on a variety of data points and/or signals, such as the CDRs references above, as well as other data points/signals, such as position coordinate sensor data that is obtained from mobile devices operating in the area. "Position coordinate sensor data" as used herein may refer to any data generated by or on behalf of a mobile device that is indicative of a position of the mobile device at a given point of time. Position coordinate sensor data may include, but is not limited to, Global Positioning System ("GPS") data, triangulation data (e.g., produced by cellular towers, wireless base stations, etc.), inertial measurement units ("IMU"), cellular tower location (which may provide a rough approximation of the mobile device's location), and so forth.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
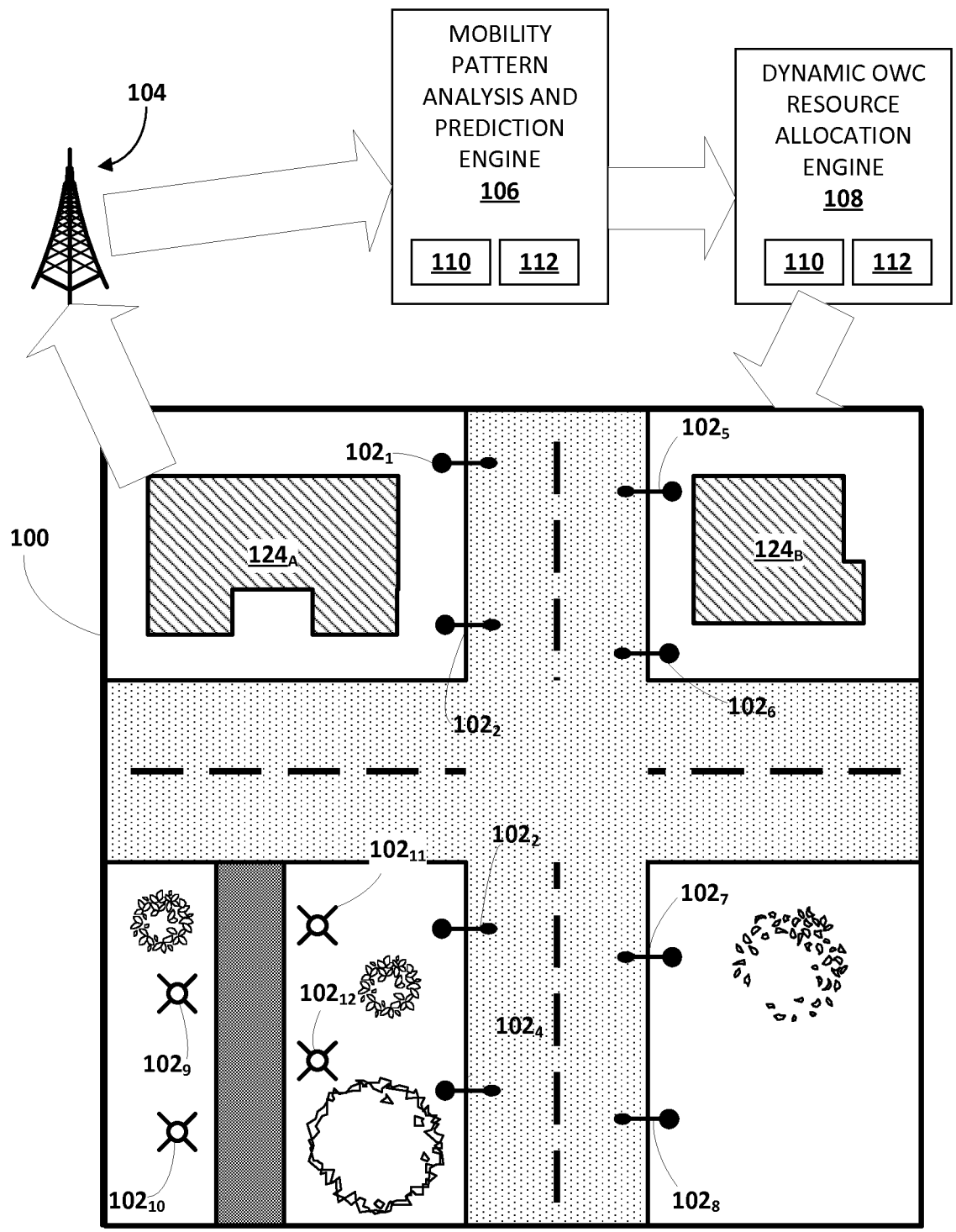
FIG. 1 illustrates schematically various components of the present disclosure, in accordance with various embodiments.

Optical wireless communication ("OWC") facilitates wireless transmission of information using visible and invisible light. Equipping lighting units for OWC may enable the lighting units to support networking-based applications, such as online retail, coupon distribution, airline/hotel/train reservations/check-ins, online review services, and so forth. As OWC-based applications gain popularity in indoor and outdoor environments, the Quality of Service ("QoS") provided by the employed OWC technology to the various applications takes on increasing importance. QoS may be impacted by varying demand generated by end users that carry or otherwise operate various mobile devices (e.g., smart phones, tablets, smart watches, other wearable devices, vehicle computing systems, etc.). For example, in outdoor environments, mobility patterns of individuals may cause significant variability in traffic patterns. Accordingly, there is a need in the art for awareness about mobility patterns and/or demographics of end users for delivering optimal QoS and differentiated services to OWC-based applications. More generally, in view of the foregoing, various embodiments and implementations of the present invention are directed to allocating OWC-related resources based on mobility patterns and/or other information to improve OWC QoS to various mobile apps. Allocating OWC resources as described herein may lead to lower packet drop rates and/or may increase channel utilization. Rather than every mobile app using all available frequency bands (which may result in each frequency band having periods of significant downtime intermixed with occasional periods of congestion), allocating frequency bands amongst multiple apps as described herein may separate traffic from different mobile apps into different frequency bands, reducing the periods of overall congestion.

One type of OWC that is commonly used is visible light communication ("VLC"). VLC may be used to modulate visible light waves to transmit and receive information, thereby facilitating wireless communication. One non-limiting VLC standard uses the visible portion of the spectrum of the light emitted by commonly available light sources such as LEDs for communication. Table 1, below, shows one non-limiting example of different bands that may be allocated as carrier waves or "channels" for communication:

TABLE 1

| Color Band | Wavelength (nm) | Spectral width |
|---|---|---|
| Band 1 | 380-450 | 70 |
| Band 2 | 450-510 | 60 |
| Band 3 | 510-560 | 50 |
| Band 4 | 560-600 | 40 |
| Band 5 | 600-650 | 50 |
| Band 6 | 650-710 | 60 |
| Band 7 | 710-780 | 70 |

As will be described in further detail below, in various embodiments, these bands may constitute OWC resources (and in this instance, VLC resources) that are available to an OWC-equipped lighting unit for communication, e.g. with one or more mobile apps operating on one or more mobile devices within a line of sight of the lighting unit. By dynamically allocating these bands (or more generally, any OWC-related resource) based on mobility patterns and/or other information, QoS associated with OWC transmissions may be improved, particularly with mobile apps deemed likely to be operated in the area.

Referring to FIG. 1, in one embodiment, a geographic area 100 may include a plurality of lighting units $102_{1-12}$ that are configured to illuminate various portions of geographic area 100. Lighting units 102 may take various forms, such as the outdoor street lamps depicted in FIG. 1, indoor lighting units (e.g., in an office building, mall, airport, stadium, etc.), architectural lights, and so forth. In various embodiments, one or more of lighting units $102_{1-12}$ may be configured to transmit information to remote computing devices and/or other lighting units 102 using OWC, such as VLC. Lighting units $102_{1-8}$ illuminate a north/south street, whereas lighting units $102_{9-11}$ illuminate a pedestrian walkway. Geographic area 100 also includes one or more buildings $124_A$ and $124_B$. Geographic area 100 is just one example of an "area" in which disclosure techniques may be employed. Disclosed techniques may also be used in other types of areas and/or environments, such as indoor environments, mixed indoor/outdoor environments, in-vehicle environments (e.g., on trains, planes, in automobiles, etc.) and so forth.

Individuals (not depicted) may travel through and/or otherwise occupy geographic area 100 at particular times in manners that may form mobility patterns. For example, if building $124_A$ is a train station and building $124_B$ is an office building, then people may travel from building $124_A$ to building $124_B$ during the morning rush hour, and in the reverse direction in the evening rush hour. Individuals travelling through or otherwise occupying geographic area 100 may operate mobile devices while in geographic area 100. Mobile devices may come in various forms, such as smart phones, tablet computers, wearable devices (e.g., smart watches, smart glasses), vehicular computing systems (e.g., navigation systems), and so forth.

Under various circumstances, mobile devices may generate various data such as CDRs (e.g., when the operating individuals make a call or send a text), position coordinate data, network application transactions (e.g., individuals operating mobile apps while in geographic area 100), and so forth. As noted above, this data may be used to detect mobility patterns of the individuals over time. For example, individuals conducting telecommunications transactions (e.g., calls, texts, etc.) may cause one or more cellular towers 104 that serve geographic area 100 to generate corresponding CDRs. Additionally or alternatively, the mobile devices may generate (with or without human intervention) position coordinate data (e.g., GPS coordinates) that may indicate the individuals' location(s) within geographic area 100 at various times. In some cases, a telecommunication provider may make at least some of this data available to a mobility pattern analysis and prediction engine ("MPAPE") 106.

MPAPE 106 may include one or more computing systems (which may be connected via one or more networks, not depicted) configured (e.g., with software) to analyze data received from one or more cellular towers 104 or other resources controlled by telecommunications providers to determine mobility patterns of individuals within geographic area 100. In some embodiments, MPAPE 106 may include standard computing components such as one or more processors 110 that may be operably coupled with memory 112. Generally, MPAPE 106 may analyze the data received from the telecommunication provider(s) to determine, for instance, how long individuals stay in a particular location or building, how often individuals change locations within geographic area 100, and/or any other patterns relevant to mobility of individuals within geographic area 100. In some embodiments, the data analyzed by MPAPE 106 may include anonymized bulk data from one or more sources such as CDRs, outdoor cameras, indoor cameras, spectrometers, vehicle tracking logs, surveys, position coordinate logs, and/or any other source of data suitable for indicating a pattern of mobility of individuals in geographic area 100. In the context of FIG. 1, for instance, MPAPE 106 may detect a first mobility pattern that suggests increased traffic from building $124_A$ to building $124_B$ during weekday mornings, and a second mobility pattern that suggests increased traffic from building $124_B$ to building $124_A$ during weekday afternoons.

In some embodiments, MPAPE 106 may obtain other information as well, from telecommunication providers or elsewhere. For example, in some embodiments, MPAPE 106 may be provided with information about web traffic data sent and/or received by individuals operating mobile devices within geographic area 100. This web traffic data may include various levels of information exchanged by mobile apps, such as hypertext transfer protocol ("HTTP") data, hypertext markup language ("HTML") data, extensible markup language ("XML") data, JavaScript Object Notation ("JSON") data, simple object access protocol ("SOAP") data, web services description language ("WSDL") data, and so forth. In various embodiments, MPAPE 106 may use this web traffic data to determine one or more mobile app usage patterns, preferences (e.g., determined from "likes" and "dislikes" on social media), and/or demographics of individuals operating mobile devices within geographic area 100.

For example, MPAPE 106 may detect increased usage of weather- and/or traffic-related mobile apps during the morning and evening commutes. During lunch hours, MPAPE 106 may detect increased usage of mobile apps related to restaurants (e.g., review apps, navigational apps, reservation apps, etc.). In some embodiments, MPAPE 106 may infer one or more demographics about individuals in geographic area 100 based on web traffic data as well. For example, if a large fraction of individuals operating mobile devices in geographic area 100 at a given time tend to operate a particular mobile app, then user demographics known to be associated with that mobile app may be inferred with respect to the population of individuals within geographic area 100 at the given time.

MPAPE 106 may infer preferences and/or demographics of individuals within geographic area 100 based on other data as well. For example, in some embodiments, MPAPE 106 may utilize census data (not depicted) to determine demographics of individuals (e.g., ages, genders, socioeconomic status, etc.) that live within geographic area 100, such as age distributions, gender distributions, income distributions, and so forth. In various embodiments, MPAPE 106 may project these demographics onto the mobility patterns, e.g., as an assumption that the individuals conforming to a mobility pattern are similar demographically to individuals indicated by census data to be located within geographic area 100. Preferences of individuals may be determined, for instance, using web traffic to determine what individuals operating mobile devices within geographic area "like" or "dislike" on social media, as well as using click through rates and/or other similar metrics on what links individuals select while within geographic area 100.

In various embodiments, MPAPE 106 may provide mobility and/or mobile app usage patterns, and/or any demographics it can infer, to dynamic OWC resource allocation engine ("DOAE") 108. In some embodiments, DOAE 108 may include one or more computing systems configured to control light emitted by one or more lighting units 102 within geographic area 100. In various embodiments, DOAE 108 may include standard computing components such as one or more processors 110 that may be operably coupled with memory 112. Based on data received from MPAPE 106, DOAE 108 may be configured to optimize one or more layers of OWC, such as the physical and/or medium layers, to improve QoS. For example, in some embodiments, DOAE 108 may enforce a dynamic network protocol at the physical layer to allocate one or more OWC resources of at least one of the one or more lighting units 102 for transmission of data to one or more mobile apps operating on one or more mobile devices operated within geographic area 100. For example, suppose mobility and mobile app usage patterns provided by MPAPE 106 indicate increased usage of a particular mobile app during the lunch hour on weekdays. DOAE 108 may increase OWC resources (e.g., the number of bands) used by one or more lighting units 102 within geographic area 100 to exchange data with the particular mobile app. By increasing or otherwise selectively allocating OWC resources used to communicate with a particular mobile app, QoS for the mobile app may be improved.

Figure 2:
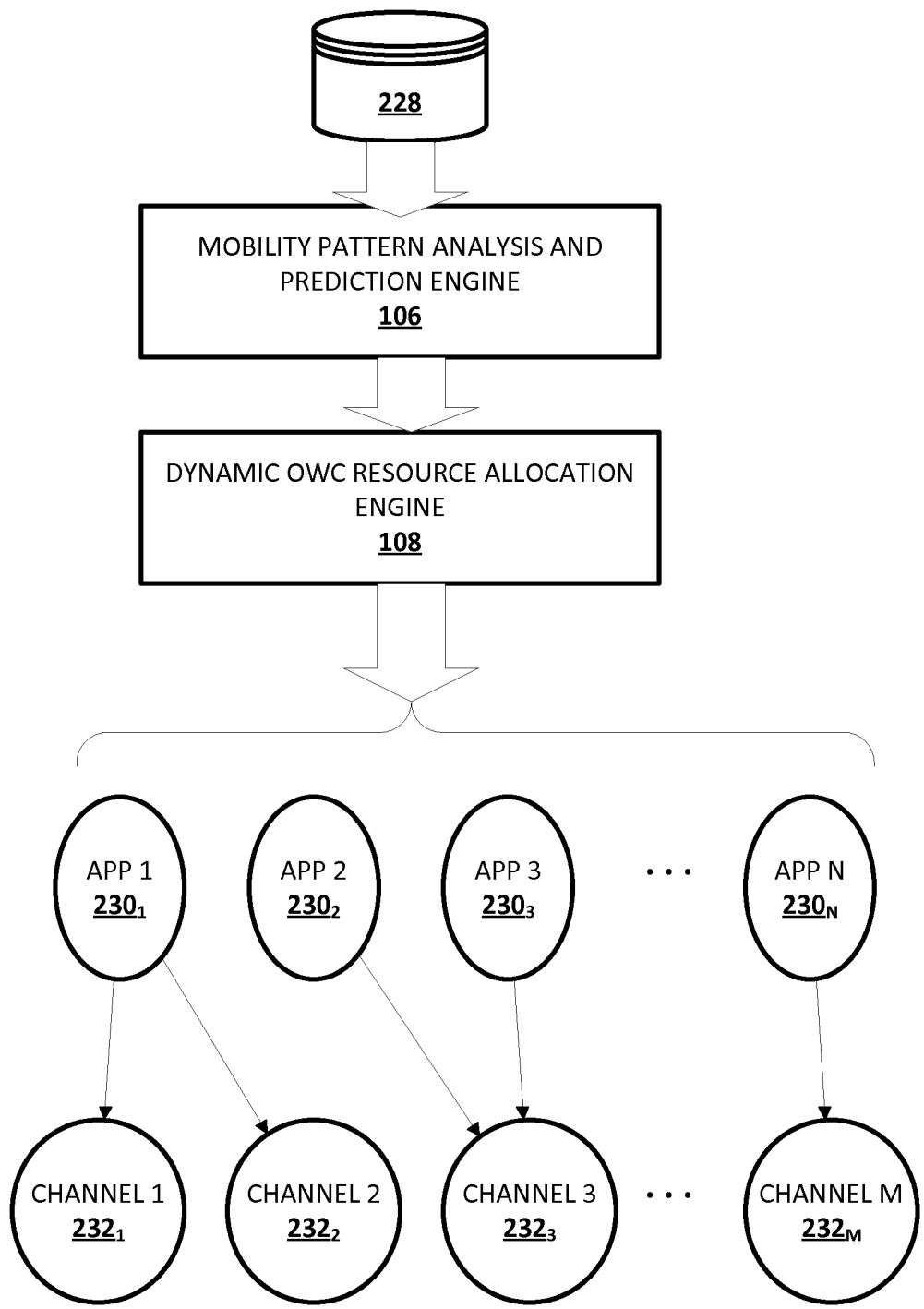
FIG. 2 schematically depicts an example flow of data, in accordance with various embodiments.

FIG. 2 schematically depicts an example process flow that may be implemented by various components of FIG. 1. In this example, raw mobility data such as CDRs, position coordinate data, or other similar data described above may be obtained from a database 228. As noted above, in some embodiments, database 228 may be populated with data that is provided by one or more telecommunications providers, e.g., using data generated at cellular towers and/or other components of a telecommunications system. In other embodiments, data may be proved by telecommunications providers in real time or using other data transfer means, such as batch downloads, etc. In yet other embodiment, data provided by telecommunications providers or other similar entities may already be analyzed to identify mobility patterns (e.g., the data may include annotations and/or may be summarized to indicate mobility patterns).

MPAPE 106 may obtain this data and as described above (assuming mobility patterns are not already pre-identified and/or pre-annotated) may identify one or more mobility patterns from the data. In some embodiments, data in database 228 may be periodically and/or continuously updated. In some such embodiments, MPAPE 106 may obtain data from database 228 periodically (e.g., hourly, daily, weekly, monthly, etc.) and/or continuously, so that MPAPE 106 can continue to detect new mobility patterns and/or modify existing mobility patterns based on new data. As noted above, in some embodiments, MPAPE 106 may additionally or alternatively identify mobile app usage patterns of individuals in geographic area 100, e.g., based on web traffic data or other data that may or may not be provided by the same telecommunications provider(s). In some instances, mobile app usage patterns may be determined by MPAPE 106 based at least in part on mobility patterns from database 228.

The mobility patterns identified by MPAPE 106 may be provided to DOAE 108 on a periodic or continuous basis (e.g., as new mobility patterns are detected by MPAPE 106), and/or on demand. As described above, DOAE 108 may allocate one or more OWC resources of at least one of the one or more lighting units (102) for transmission of data to one or more of a plurality of mobile apps operating on one or more mobile devices operated within geographic area 100. For example, DOAE 108 may transmit one or more allocation commands to one or more lighting units 102, e.g., using various network communication protocols (e.g., cellular, Wi-Fi, ZigBee, OWC, Z-Wave, etc.). As noted above, in some embodiments, this allocation of OWC resources may be based at least in part on the determined mobile app usage patterns described above. In FIG. 2, for instance, the OWC resources includes light channels $232_{1-M}$, which may be allocated among various mobile apps $230_{1-N}$, using techniques such as frequency-division multiplexing ("FDM"). In some embodiments, more complex schemes such as orthogonal frequency-division multiplexing ("OFDM") may be utilized across one or more channels, or within a single channel.

Suppose APP 1 $230_1$ relates to local restaurants (e.g., review app, reservation app, discount coupon app, etc.) and that APP 2 $230_2$ relates to local establishments pertaining to children (e.g., toy stores, playgrounds, etc.). Suppose further that in the geographic location under consideration, at the present time, MPAPE 106 determines that an applicable mobility pattern and/or mobile app usage pattern indicates that the instantaneous population (e.g., a population snapshot) is likely to include mostly adults looking for meals (e.g., dinnertime). APP 1 $230_1$ is more likely to be useful to the projected current population of the geographic area than APP 2 $230_2$. Consequently, DOAE 108 may allocate two channels (Channel 1 $232_1$ and Channel 2 $232_2$) available to local light sources to APP 1 $230_1$. By contrast, because the instantaneous local population is less likely to include many children, APP 2 $230_2$ may be less useful to the projected current population of the geographic area. Accordingly, APP 2 $230_2$ may only be allocated a single channel, Channel 3 $232_3$.

These techniques may be applied to allocate OWC resources to other mobile apps $230_3$-$230_N$. For example, suppose that mobility and/or usage patterns reveal that APP 3 $230_3$ is also not likely to be useful to a substantial portion of the current projected local population. APP 3 $230_3$ may also be allocated a single channel, Channel 3 $232_3$. As depicted in FIG. 2, in some embodiments, multiple mobile apps may share the same channel, as is the case with APP 2 $230_2$ and APP 3 $230_3$. In such embodiments, the shared channel may be allocated in a manner such that data is modulated differently for different applications. For example, in some embodiments, within a single frequency channel, time-division multiplexing ("TDM") or other similar techniques may be employed to distinguish traffic to/from one associated mobile app from traffic to/from another mobile app sharing the frequency channel. In other embodiments, frequency channels 232 may not be shared among mobile apps (i.e. different subsets of bands allocated to different mobile apps may be disjoint).

DOAE 108 may select how it allocates OWC resources in various ways. In some embodiments, DOAE may employ a rules based approach to allocate frequency channels $232_{1-M}$ amongst a plurality of mobile apps $230_{1-N}$. For example, if the majority of people in a geographic area are projected by MPAPE 106 to be in their twenties, then more bandwidth (e.g., more frequency channels 232) may be allocated to mobile apps that benefit or otherwise are predominantly used by such a demographic.

In some embodiments, allocation of OWC resources may include enforcement of a network protocol that allocates OWC physical layer resources based at least in part on predicted usage of OWC-based mobile apps. Table 2, below, demonstrates one example of how OWC physical layer resources—namely, multiple OWC frequency bands—may be allocated using a rule-based technique. In Table 2, a seven bit code is used to denote to mobile apps how the seven available bands (similar to Table 1) should be used.

TABLE 2

| Bit Pattern | Band 1 | Band 2 | Band 3 | Band 4 | Band 5 | Band 6 | Band 7 |
|---|---|---|---|---|---|---|---|
| 0000001 | X | X | X | X | X | X | ◯ |
| 0000010 | X | X | X | X | X | ◯ | X |
| ... | | | | | | | |
| 0100110 | X | ◯ | X | X | ◯ | ◯ | X |
| 1000000 | ◯ | X | X | X | X | X | X |
| ... | | | | | | | |
| 1111111 | ◯ | ◯ | ◯ | ◯ | ◯ | ◯ | ◯ |

Suppose a user is travelling through an area illuminated by lighting units configured with selected aspects of the present disclosure. Suppose further that the user is carrying or otherwise operates a mobile device that executes a particular mobile app that receives push notifications (e.g., "happy hour specials nearby") from establishments that have previously arranged for such notifications to be pushed to users of the particular application. Traditionally, a cellular connection of the user's mobile device may be used to push this notification to the user's mobile device, e.g., as a pop-up message on the user's screen, in response to a determination based on the user's GPS coordinates that the user is near a participating establishment. However, using techniques described herein, the user's mobile device may instead receive such a push notification (and may send responsive data) using OWC from one or more lighting units near a participating establishment. Accordingly, mobile apps may receive such notifications in areas in which cellular and/or GPS signals may not be available, such as indoors, on trains or planes, etc.

In some embodiments, an operating system or other component of the user's mobile device (e.g., a separate OWC interface controller) may be notified, e.g., via one or more OWC transmissions from nearby lighting units or by other out-of-band means such as cellular communication, etc., that a first mobile app has been allocated particular OWC band(s) for communication. Using the example of Table 2, the bit pattern "0000001" may be associated with the first mobile app, and that association may be communicated to the operating system of the user's mobile device. The operating system (or separate OWC interface controller) may use that bit pattern to determine that Band 7 is allocated for the first mobile app to exchange data via one or more nearby lighting units using OWC. Thereafter, the operating system may only provide inbound data (e.g., a serial stream of bits) received via Band 7 to the first mobile app. Inbound data received via other OWC bands may be ignored, or at least not provided to the first mobile app. Likewise, outbound data from the first mobile app may be transmitted using Band 7.

A second mobile app that is deemed (based on mobility and/or usage patterns, demographics, etc.) more likely than the first mobile app to be used by a relatively large portion of an instantaneous population of an area may be allocated a greater amount of OWC resources. For example, the bit pattern 0100110 may allocate Bands 2, 5, and 6 for transmission of traffic to/from the second mobile app. Thereafter, the operating system may provide inbound data (e.g., a serial stream of bits) received via Bands 2, 5, and 6 to the second mobile app. Inbound data received via other OWC bands may not be provided to the second mobile app. Likewise, outbound data from the second mobile app may be transmitted using one or more of Bands 2, 5, and 6.

In other embodiments, DOAE 108 may use more complex techniques to allocate OWC resources. For example, in some embodiments, supervised and/or unsupervised machine learning techniques may be used to train one or more models (e.g., neural networks) to provide output that dictates how one or more OWC resources should be allocated in a given scenario. For example, a neural network or other machine learning model could be trained using, as input, training data that includes various aspects of mobility and/or usage patterns in a particular scenario, and in some cases corresponding demographics, as well as various features relating to how OWC resources were allocated in that particular scenario. Negative training examples may include feature vectors that represent scenarios in which a particular allocation of OWC resources yielded a negative outcome, such as an unacceptable packet loss rate. Positive training examples may include feature vectors that represent scenarios in which a particular allocation of OWC resources yielded a positive outcome, such as relatively low packet loss. In some embodiments, the outcome (or label) of the particular training example may be determined automatically, e.g., by lighting units in the area detecting packet loss rate, jitter, etc. In some such embodiments, the model may be continuously trained using additional training examples generated over time when the lighting units use OWC to exchange data with mobile apps. For example, the lighting units may detect packet loss rate in a particular scenario, label new training data with that packet loss rate, and provide that new training data to the model as labeled input.

Figure 3:
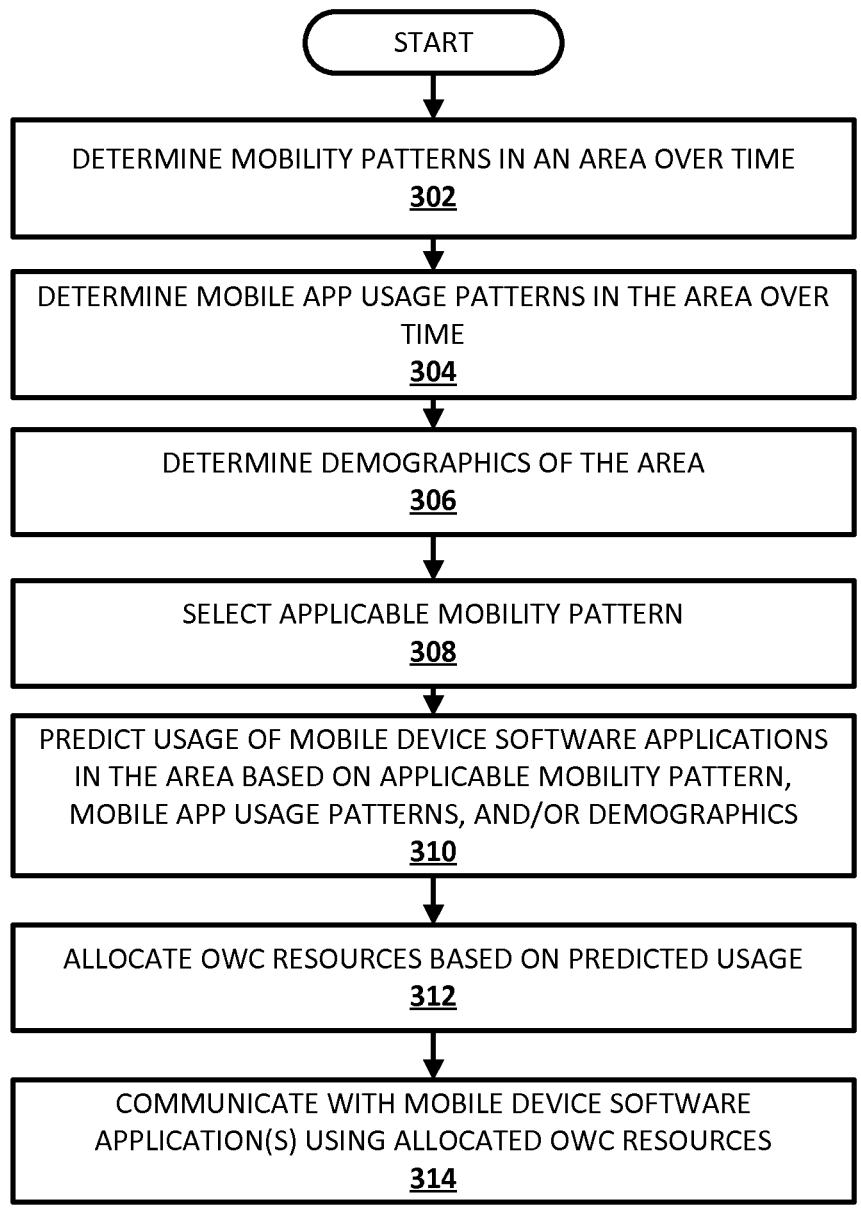
FIG. 3 depicts an example method for practicing selected aspects of the present disclosure, in accordance with various embodiments.

FIG. 3 depicts an example method 300 for implementing various aspects of the present disclosure. While operations of method 300 are depicted in a particular order, this is not meant to be limiting. In various embodiments, one or more operations of method 300 may be omitted, reordered, and/or one or more operations may be added.

At block 302, one or more mobility patterns observed in a given area over time may be determined. The area may include a geographic area such as all or a portion of a city (e.g., 100), and/or may include other indoor and/or outdoor areas illuminated by lighting units configured with selected aspects of the present disclosure, such as campuses, compounds, camps, airports, train stations, etc. As noted above, the mobility patterns may be determined on a variety of different data, including but not limited to CDRs, position coordinate data (e.g., GPS logs), and so forth. In some embodiments, the data in which mobility patterns or observed may be provided by telecommunications providers, although this is not required.

At optional block 304, mobile app usage patterns in the area may be determined over time. As noted above, these mobile app usage patterns may relate to usage of mobile apps within the area, and may be detected, for instance, using data such as the above-described web traffic data, as well as other data such as application logs, etc. In some embodiments, one or more telecommunication providers may also provide at least some of the web traffic data that is used to identify mobile app usage patterns. However, this is not required. In various embodiments, mobile app usage patterns may or may not be based on, e.g., correlated with, mobility patterns. At block 306, demographics of the area may be determined, e.g., based on census data, surveys, mobile app usage patterns, etc. As noted above, these demographics may effectively be projected onto a mobility pattern to "estimate" the demographics of individuals forming part of a given mobility pattern.

At block 308, an "applicable" mobility pattern may be selected. As a simple example, a mobility may be "applicable" to a current time (or just after a current time). For example, if rush hour is about to begin, then a mobility pattern associated with rush hour may be selected as being instantaneously (or momentarily) applicable. Then, the remaining operations of method 300 may be implemented to allocate OWC resources in real time. However, it is not necessary that an applicable mobility pattern be selected in real time. In some embodiments, an applicable mobility pattern may be selected for some point in the future. At least some of remaining operations of method 300, such as 310, may be performed immediately or later, and other remaining operations method 300 may be performed at or just before the point in the future.

At block 310, usage of mobile apps in the area may be predicted. This prediction may be based at least in part on the mobility data, but also may be predicted based on mobile app usage patterns determined at block 304 and/or demographics determined at block 306. For example, it may be predicted that for given mobility pattern expected to occur at a particular time, the individuals predicted to conform to the mobility pattern will have certain demographic characteristics (e.g., age, gender). Additionally or alternatively, and in some embodiments based on the demographics, it may be predicted that the individuals will use some mobile apps more than others.

Based on the predicted usage of mobile apps, at block 312, one or more OWC resources, such as the bands/channels described above, may be selectively allocated for use by one or more lighting units in the area to exchange information with particular mobile apps. An example of such allocation was demonstrated in FIG. 2. At block 314, one or more lighting units may transmit data to, and/or receive data from, one or more mobile apps executing on one or more mobile devices within the area using the OWC resources as allocated at block 312.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method for improving optical wireless communications based on mobility patterns, comprising:
   determining, by one or more processors, one or more mobility patterns observed in an area over time, wherein the area is illuminated by one or more lighting units, and the one or more lighting units are configured to transmit information using optical wireless communications;
   selecting, by one or more processors, an applicable mobility pattern from the one or more mobility patterns;
   predicting, by one or more processors, based on the selected mobility pattern, usage in the area of a plurality of optical wireless communications (OWC)-based mobile apps; and
   allocating one or more OWC resources of at least one of the one or more lighting units for transmission of data to one or more of the plurality of OWC-based mobile apps operating on one or more mobile devices operated within the area, wherein the allocating is based at least in part on the predicted usage.

2. The method of claim 1, further comprising estimating demographic data about a plurality of individuals in the area based on census data associated with the area.

3. The method of claim 2, wherein the predicted usage in the area of the plurality of OWC-based mobile apps is further predicted based on the demographic data.

4. The method of claim 1, further comprising predicting resource allocation needs of the plurality of OWC-based mobile apps based at least in part on the predicted usage.

5. The method of claim 1, wherein the allocating comprises enforcing a network protocol that allocates OWC physical layer resources based at least in part on the predicted usage.

6. The method of claim 1, wherein the one or more OWC resources include a plurality of light bands.

7. The method of claim 6, wherein the allocating further comprises allocating a first subset of the plurality of light bands for transmission of data to a first of the plurality of OWC-based mobile apps, and allocating a second subset of the plurality of light bands for transmission of data to a second of the plurality of OWC-based mobile apps.

8. The method of claim 7, wherein the first and second subsets are disjoint.

9. The method of claim 1, wherein the one or more OWC resources comprise one or more visible light communications resources.

10. The method of claim 1, wherein the allocating is further based on a quality of service requirement associated with at least one of the plurality of OWC-based mobile apps.

11. The method of claim 1, wherein the mobility patterns are determined based on accumulated call data records generated by mobile devices operated within the area.

12. The method of claim 1, wherein the mobility patterns are determined based on position coordinate data generated by mobile devices operated within the area.

13. A system comprising:
one or more lighting units configured to illuminate an area, wherein the one or more lighting units are configured to transmit information using optical wireless communication;
one or more processors operably coupled with the one or more lighting units; and
memory operably coupled with the one or more processors, wherein the memory stores instructions that, in response to execution of the instructions by the one or more processors, cause the one or more processors to:
determine one or more mobility patterns observed in the area over time;
select an applicable mobility pattern from the one or more mobility patterns;
predict usage in the area of a plurality of mobile apps; and
allocate one or more optical wireless communications (OWC) resources of at least one of the one or more lighting units for transmission of data to one or more of the plurality of OWC-based mobile apps operating on one or more mobile devices operated within the area, wherein the allocating is based at least in part on the predicted usage and one or more mobility patterns.

14. The system of claim 13, further comprising instructions to estimate demographic data about a plurality of individuals in the area at a given time.

15. At least one non-transitory computer-readable medium stores instructions that, in response to execution of the instructions by one or more processors, cause the one or more processors to perform the following operations:
determining one or more mobility patterns observed in an area over time, wherein the area is illuminated by one or more lighting units, and the one or more lighting units are configured to transmit information using optical wireless communications;
selecting an applicable mobility pattern from the one or more mobility patterns;
predicting, based on the selected mobility pattern, usage in the area of a plurality of optical wireless communications (OWC)-based mobile apps; and
allocating one or more OWC resources of at least one of the one or more lighting units for transmission of data to one or more of the plurality of OWC-based mobile apps operating on one or more mobile devices operated within the area, wherein the allocating is based at least in part on the predicted usage.

* * * * *